US012194346B2

(12) United States Patent
Engler et al.

(10) Patent No.: US 12,194,346 B2
(45) Date of Patent: Jan. 14, 2025

(54) ILLUMINATED OBJECT SYSTEMS AND METHODS

(71) Applicant: P&P Imports LLC, Irvine, CA (US)

(72) Inventors: Peter H. Engler, Newport Beach, CA (US); Peter L Tanoury, Newport Beach, CA (US); Willis S. Santamaria, Diamond Bar, CA (US)

( * ) Notice: Subject to any disclaimer, the term of this patent is extended or adjusted under 35 U.S.C. 154(b) by 0 days.

(21) Appl. No.: 18/226,769

(22) Filed: Jul. 26, 2023

(65) Prior Publication Data

US 2024/0033582 A1 Feb. 1, 2024

Related U.S. Application Data

(60) Provisional application No. 63/392,454, filed on Jul. 26, 2022.

(51) Int. Cl.
*A63B 43/06* (2006.01)
*F21V 15/01* (2006.01)

(52) U.S. Cl.
CPC .............. *A63B 43/06* (2013.01); *F21V 15/01* (2013.01); *A63B 2225/74* (2020.08); *A63B 2243/0062* (2013.01)

(58) Field of Classification Search
CPC ... A63B 43/06; A63B 2225/74; F21V 33/008; F21V 15/01; F21Y 2107/20; A63H 33/18
See application file for complete search history.

(56) References Cited

U.S. PATENT DOCUMENTS 5,609,411 A * 3/1997 Wang .................... A63B 43/06 362/253
2015/0159858 A1 * 6/2015 Lin .......................... F21K 9/61 362/311.01

* cited by examiner

*Primary Examiner* — William J Carter

(57) ABSTRACT

Techniques are disclosed for systems and methods to provide illuminated sporting equipment assemblies. An illuminated sporting equipment assembly may include a sporting equipment object such as a game ball and a light cap assembly configured to be secured to the game ball, where the light cap assembly includes a light cap assembly housing configured to secure an integrated circuit stack configured to generate light within the illumination cavity of the sporting equipment object.

19 Claims, 7 Drawing Sheets

ILLUMINATED OBJECT SYSTEMS AND METHODS

CROSS-REFERENCE TO RELATED APPLICATIONS

This application claims priority to and the benefit of U.S. Provisional Pat. App. No. 63/392,454 filed Jul. 26, 2022 and entitled "System and Apparatus for Providing an Illuminated Object," which is incorporated by reference herein in its entirety.

TECHNICAL FIELD

One or more embodiments of the invention relate generally to illuminated objects and more particularly, for example, to systems and methods for providing illuminated sporting equipment and assemblies.

BACKGROUND

Marrying sporting equipment with illumination systems can be difficult. In particular, with respect to sporting equipment that is regularly thrown, dropped, hit, or kicked, conventional fragile and/or difficult to maintain or seal illumination electronics can often become damaged or deenergized when used in outdoor conditions, for example, or be permanently sealed (or become permanently sealed via mechanical damage) and therefore impossible to maintain or repair. Alternative conventional illuminated sporting equipment may employ chemical light solutions (glow sticks) or may be manufactured from phosphor materials (glow-in-the-dark phosphor materials and/or impregnated plastics), but such mechanisms typically must be replaced or "recharged" after mere minutes of play. Thus, there is a need for an improved methodology to provide illuminated sporting equipment, particularly in the context of ball games.

SUMMARY

Techniques are disclosed for systems and methods to provide illuminated sporting equipment assemblies. An illuminated sporting equipment assembly may include a sporting equipment object such as a game ball and a light cap assembly configured to be secured to the game ball, where the light cap assembly includes a light cap assembly housing configured to secure an integrated circuit stack configured to generate light within the illumination cavity of the sporting equipment object.

In one embodiment, an illuminated sporting equipment assembly may include a sporting equipment object comprising an illumination cavity; and a light cap assembly configured to be secured to the sporting equipment object, wherein the light cap assembly comprises a unitary light cap assembly housing configured to secure an integrated circuit stack within the illumination cavity of the sporting equipment object.

In another embodiment, a system for an illuminated ball game may include a sporting equipment object comprising an illumination cavity; and a light cap assembly configured to be secured to the sporting equipment object, wherein the light cap assembly comprises a unitary light cap assembly housing configured to secure an integrated circuit stack within the illumination cavity of the sporting equipment object.

The scope of the invention is defined by the claims, which are incorporated into this section by reference. A more complete understanding of embodiments of the invention will be afforded to those skilled in the art, as well as a realization of additional advantages thereof, by consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
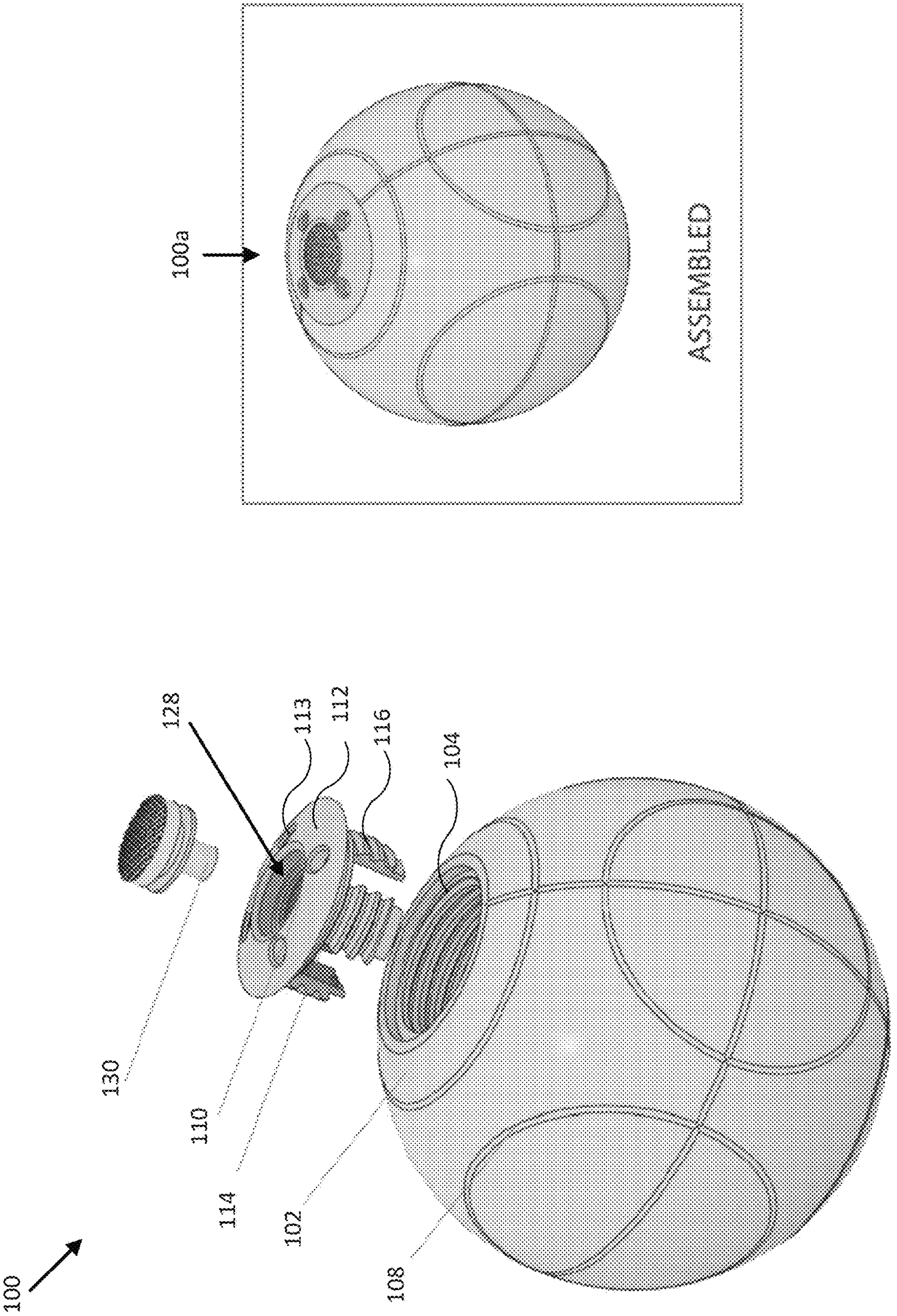
FIG. 1 illustrates an illuminated sporting equipment assembly in accordance with an embodiment of the disclosure.

In accordance with various embodiments of the present disclosure, sporting equipment illumination may be provided by an illuminated sporting equipment assembly including a sporting equipment object such as a game ball and a light cap assembly configured to be secured to the game ball, where the light cap assembly includes a light cap assembly housing configured to secure an integrated circuit stack configured to generate light within the illumination cavity of the sporting equipment object.

Those of ordinary skill in the art will appreciate that depending on the particular application at hand, many modifications, substitutions, and variations can be made in, and to, the materials, apparatus, configurations, and methods of use of the devices of the present disclosure, and the innovations herein are not limited to any of the particular embodiments that are illustrated and described herein. The description below is merely an explanation by way of some examples thereof that should be fully commensurate with that of the claims appended hereafter and their functional equivalents, and merely serves to inform one of ordinary skill in the art how to make and use the innovations disclosed herein. As used herein, securely coupling means coupling in a manner that prevents decoupling under kinetic forces, such as the type of which that are encountered under normal game play conditions.

Disclosed herein are apparatus and systems including an illuminated sporting equipment assembly, and in particular, an illuminated game ball for a ball game or system, such as a bocce ball. One or more embodiments may correspond to an assembly including a light cap assembly configured to securely couple an integrated circuit (IC) stack inside an illumination cavity of a sporting equipment or object, such as a game ball bore, as described more fully herein.

Accordingly, one or more embodiments described herein correspond to a system and apparatus for an illuminated game ball. An illuminated game ball system may include a game ball including a hollow interior portion or illumination cavity or game ball bore, a cylindrical light cap assembly comprising a button module, where the light cap assembly is configured to securely retain an IC stack within the game ball bore, and a cap wrench configured to engage and disengage the light cap assembly from the game ball. In some embodiments, the IC stack may be implemented as a light-emitting diode (LED) circuit including a printed circuit board (PCB), an LED, a power bus, a power supply, an actuator switch, and a support base, where the PCB (e.g., a first or second layer of the PCB) may be physically and/or electrically coupled to the support base via one or more vertical members (e.g., electronic components, wires, conductive ribbons, insulating support tabs), and where the light cap assembly is configured to securely couple the IC stack within the hollow interior portion or game ball bore.

In some embodiments, the light cap assembly includes a top surface conforming to a shape of the game ball. The light cap assembly may have a threaded cylindrical body including a plurality of flexible prongs, where each prong includes a tab configured to engage with the IC stack. The flexible prongs may be spaced apart in a manner that conforms to a shape and extent of the PCB and/or IC stack. For example, in embodiments where the IC stack includes a conductive ribbon implementing the power bus, a width of such power bus ribbon may correspond to a width between at least two of the flexible prongs. As shown and described herein, the spacing between the flexible prongs includes gaps that may be sized in a manner that compliments vertical members of the IC stack. The IC stack may include vertical members for fixing the PCB to the support base and also serves to counter any rotational forces caused by the kinetic energy of game play.

In various embodiments, the support base may be coupled to an actuator switch, and the light cap assembly may include a button module. When pressed, the button module activates the actuator switch. Activating the actuator switch generates an actuator signal, which triggers the IC stack to deliver power from the power supply to a light source (e.g., an LED) powered by the IC stack. The IC stack may be configured to require the actuator signal to be continuous for at least 2 seconds before the IC stack powers or lights the LED. Requiring a continuous signal of at least 2 seconds prevents unwanted actuation that may result from typical gameplay. The PCB may include a plurality of vertical members. The vertical members are fixedly coupled to the support base and extend from the support base to the IC stack. For example, a microstrip member that connects the support base to the PCB may be configured to engage with a predetermined gap between two of the four flexible prongs.

As described herein, the LED circuit may be implemented as an IC stack, which may include an actuator switch, a support base, one or more power sources (batteries) implementing the power supply, and a PCB. The PCB may include an LED module, a microcontroller, an operational amplifier, a (100-ohm) resistor, (two) capacitors, a latch, and a power bus, among other electronic components, as described herein. The actuator switch may be positioned on a bottom facing side of the support base of the IC stack; the support base can serve as a floor for one or more batteries (e.g., the power supply). In some embodiments, a first battery can be placed on a top side of the support base and a second battery may be stacked on top of the first battery. The PCB may be stacked on top of the second battery. A diameter of the PCB board may be selected such that the PCB board extends radially outward relative to the components underneath to form a slight overhang relative to the batteries/power supply positioned below.

In embodiments where the illuminated sporting equipment system corresponds to a bocce ball game, such system may include eight illuminated bocce balls (e.g., 2 red, 2 green, 2 blue, 2 yellow), one illuminated pallino ball (e.g., a white jack), a distance marker, a carrying case, and/or an opening tool. Bocce ball game rules may include free play rules. With free play bocce, the rules and setup can be much easier when there is no court to play on. Games can be played on any soft surface (grass, turf, sand, clay etc.). 2-4 players can participate, with each player getting 2 balls of the same color. A coin flip can decide which player throws the pallino first. The game objective is to throw bocce balls closer to the pallino than an opponent throws their bocce balls. The first player/team to reach 12 points wins the game (e.g., in some games, a win must be by 2 points). A match typically consists of 3 rounds. The pallino is the first ball put into play after a coin toss. It should be tossed underhand within a reasonable distance. Once the pallino is in play, it can be knocked anywhere on the desired playing field.

All balls are thrown underhand. Players alternate throwing their bocce balls in order until all balls are thrown. Once all bocce balls have been thrown at the pallino, calculate the scoring for that frame. The player with the ball closest to the pallino gets 1 point. If the second closest ball is also theirs, they get 2 points. Only 1 player scores per frame. If a bocce ball is touching the pallino, it's often known as a "baci" or "kiss" and is awarded 2 points if they remain touching at the end of the frame. The winning player is the first to reach 12 points and players must win by 2.

Bocce balls typically are heavy projectiles, and so an outdoor court and throwing area should be clear of people, pets, or obstacles prior to each throw, and player should never stand in an area where the balls might land, particularly when playing at night. Illuminated bocce balls will wear over time, but scuff marks are only superficial and will not affect game play. Embodiments of the illuminated bocce balls described herein are water resistant, so a little water from playing on a wet lawn will do no harm, and players should ensure all illuminated balls are turned off before storage to avoid drained batteries (e.g., which can be replaced).

Each LED bocce ball may be configured to use two CR2032 'coin' batteries as the power supply. In various embodiments, only 3-volt CR2032 lithium cell batteries should be used. To replace the batteries and/or service the bocce balls, a user should unscrew the bocce ball light cap assembly using a cap wrench and pull out the LED circuit/IC stack. The cap wrench may be attached to a tote bag drawstring. In various embodiments, to activate a bocce ball illumination, a user presses and holds down firmly the ball's button module for 2 seconds (repeat to deactivate). The 2 second delay is designed so the illumination doesn't accidentally turn off or on during play. 2 new CR2032 batteries may be inserted to replace the depleted batteries, with "+" sides matching the orientations shown herein. Push the LED circuit/IC stack back into the bocce ball light cap assembly by aligning the black tabs on the LED circuit/IC stack with two openings on the light cap assembly as shown. Then screw the light cap assembly back onto the bocce ball and tighten it firmly with the cap wrench. A pencil or other pointed object may be used to push old batteries out of the IC stack.

Embodiments of the light cap assembly and/or IC stack described herein may be used in a variety of sporting equipment assemblies and/or systems. For example, the light cap assembly and IC stack may be used in field or inflatable cones configured to provide illuminated cones for sport play. The light cap assembly and IC stack may be utilized in any type of visible-light transparent or translucent sporting equipment object or assembly that includes or may be manufactured with an internal space or cavity. For example, such sporting equipment may include footballs, baseballs, volleyballs, softballs, golf balls, foam balls, decorative figures, and any other type of sporting equipment or object that is at least partially opaque or partially transparent with an internal cavity or void such that light generated by an internal LED is visible and shines at least partially through the partially transparent or partially opaque material of the sporting equipment or object.

In certain aspects, the reference to the singular form of a word may also refer to the plural, and a reference to the plural form of a word may refer to the singular thereof. While some of the advantages of the multiple attachment point clay target hanger disclosed herein are provided, the advantages are not limited to those described herein, as one of ordinary skill in the art will apricate more advantages and embodiments than those explicated listed or described herein.

FIG. 1 illustrates an illuminated sporting equipment assembly 100. In particular, assembly 100 may implement one of a plurality of assemblies incorporated into a system for an illuminated ball game, as described herein. In FIG. 1, assembly 100 includes ball body 102, threads 104 of ball body 102 leading to an illumination cavity 106 (shown in FIG. 2), light cap assembly housing 110 configured to securely couple to ball body 102 via threads 104, and button module 130 configured to be inserted into light cap assembly housing 110 to form (e.g., with an IC stack 840 shown in FIG. 8) a light cap assembly (e.g., light cap assembly 510, 610, or 710 shown in FIGS. 5-7). As shown in FIG. 1, light cap assembly housing 110 includes top surface 112 confirming to a shape of ball body 102, flexible threaded prongs 116 configured to secure an IC stack within light cap assembly housing 110, and wrench notches 113 configured to receive corresponding wrench nodes 913 of cap wrench 900 shown in FIG. 9. In some embodiments, light cap assembly housing 110 may include button orifice 128 configured to receive and secure button module 130, such as via threads and/or a permanent or semi-permanent snap assembly notches and conforming rings formed in light cap assembly housing 110 and/or button module 130. Assembly 100 is shown assembled as illuminated sporting equipment assembly/illuminated bocce ball 110*a*.

Figure 2:
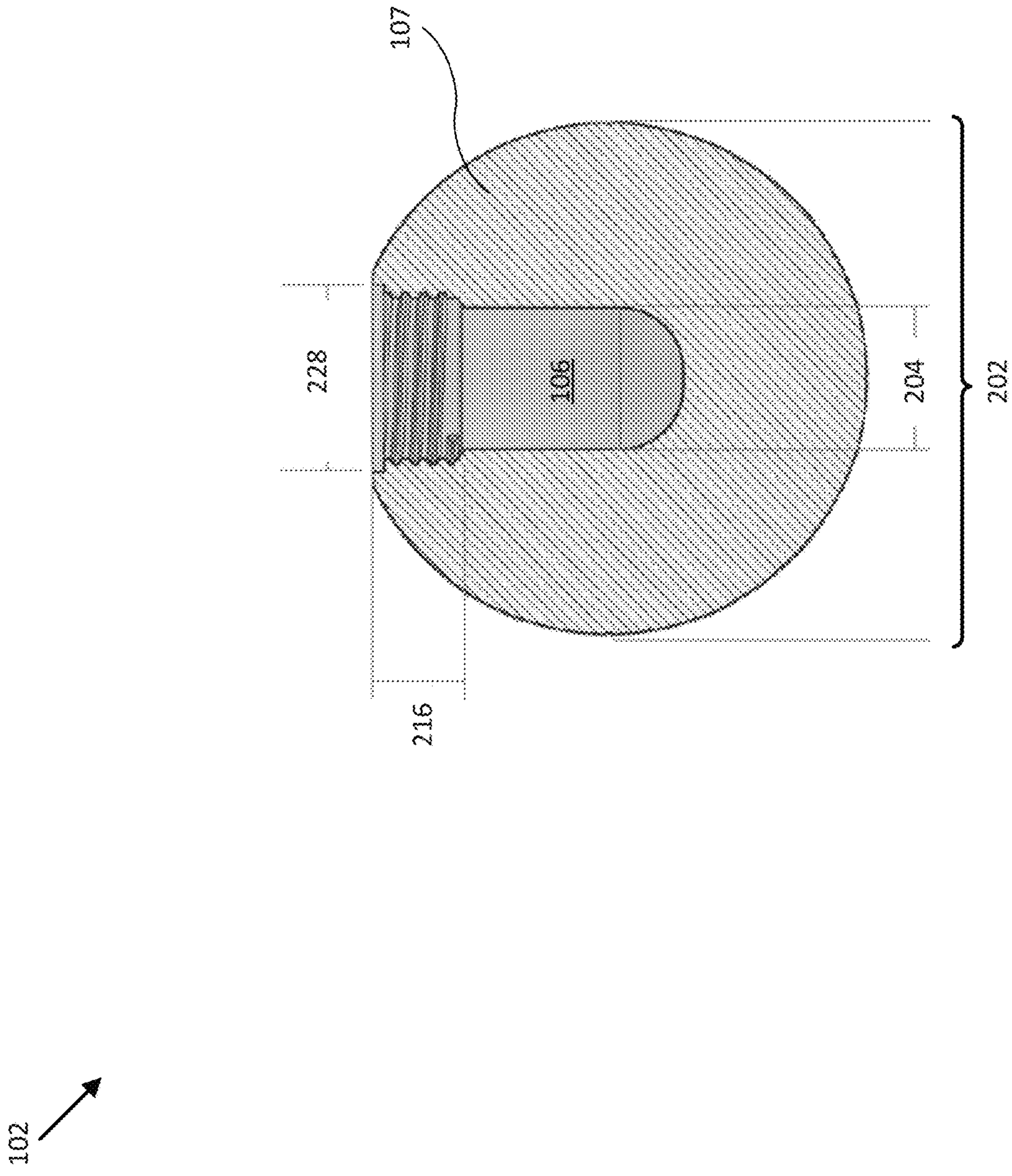
FIG. 2 illustrates an illuminated sporting equipment assembly in accordance with an embodiment of the disclosure.

FIG. 2 illustrates a cross section of ball body 102 for illuminated sporting equipment assembly 100. In FIG. 2, ball body 102 includes illumination cavity 106, threaded portion 216 of illumination cavity 106, and transparent and/or translucent body material 107. A illumination cavity orifice diameter 228 may be configured to match a diameter of light cap assembly housing 110, for example, and a depth of threaded portion 216 may be selected to include 3 or more threads so as to provide a reliable securing mechanism coupling ball body 102 to light cap assembly housing 110. A cavity diameter 204 of illumination cavity 106 may be different from illumination cavity orifice diameter 228, for example, such as larger than illumination cavity orifice diameter 228. Body diameter/shape 202 may be any diameter or shape suited for a particular sporting equipment assembly or sport, as described herein.

Figure 3:
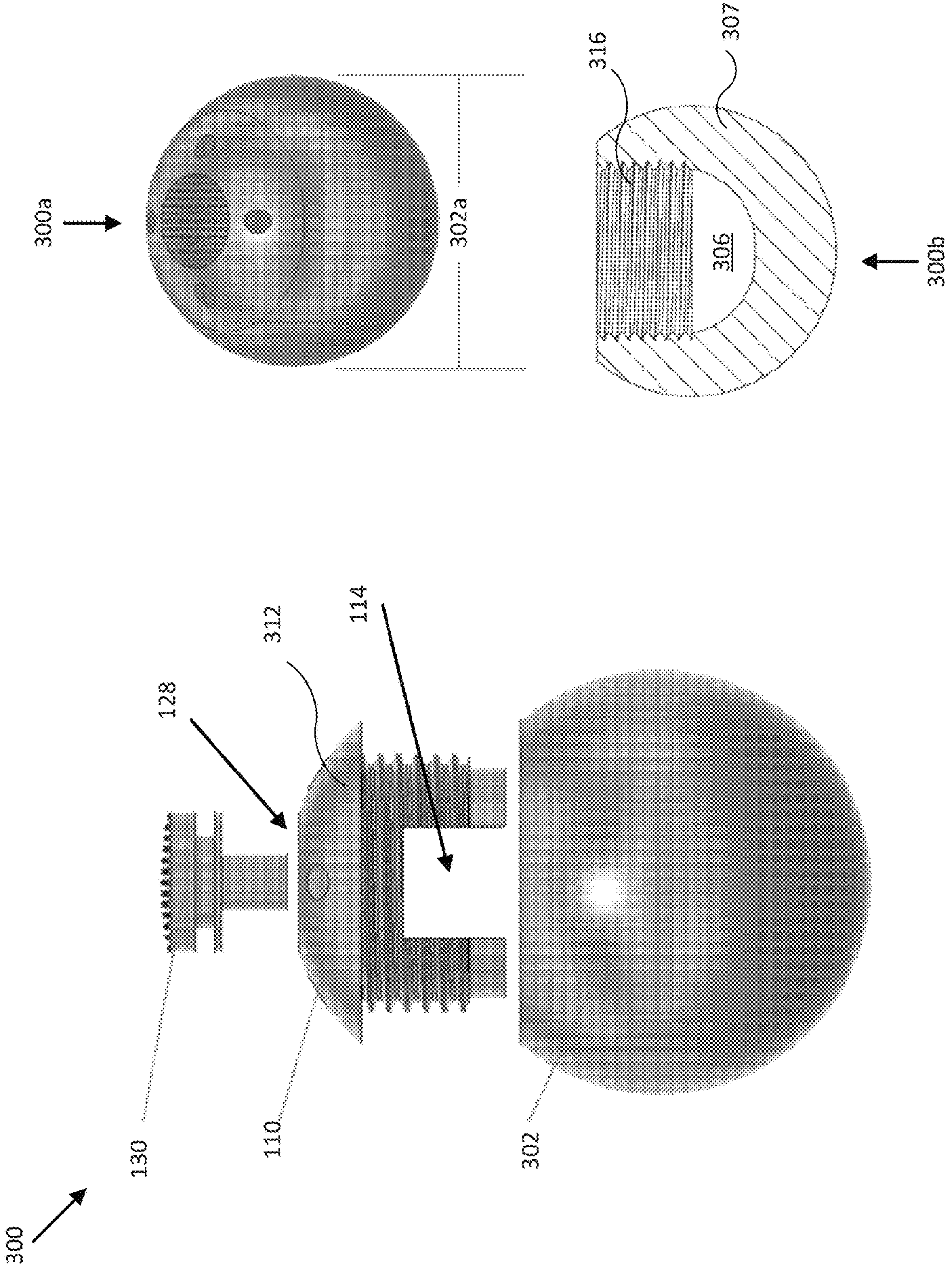
FIG. 3 illustrates a system for an illuminated ball game in accordance with an embodiment of the disclosure.

FIG. 3 illustrates a system 300 for an illuminated ball game, as described herein. In particular, system 300 may illustrate an embodiment of a pallino ball for bocce. As can be seen in FIG. 3, each of light cap assembly housing 110, button module 130, and other elements similar to those shown for assembly 110 in FIG. 1 may be implemented similarly for system 300. Ball body 302 may be significantly smaller than ball body 102 (e.g., as shown by diameter 302*a* of assembled system 300*a*), for example, and top surface 312 may be selected to conform with such differently sized and/or shaped body, as shown. Moreover, illumination cavity 306 may be shaped differently than illumination cavity 106, and threaded portion 316 may be different from threaded portion 116, and body material 307 may be different from body material 107, so as to accommodate the different shape and/or size of ball body 102, as shown in cross section 300*b*.

Figure 4:
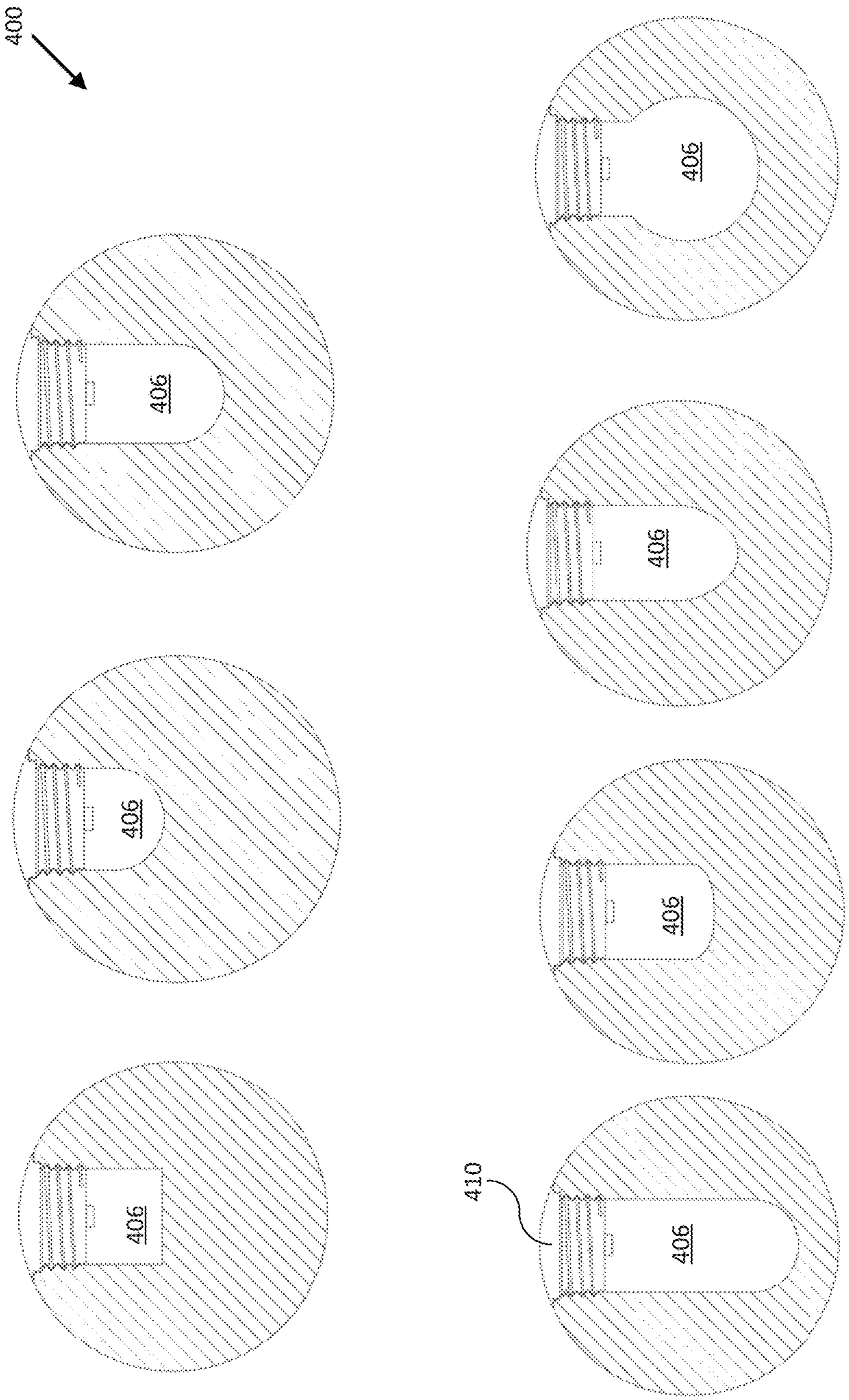
FIG. 4 illustrates a system for an illuminated ball game in accordance with an embodiment of the disclosure.

FIG. 4 illustrates a variety of sizes and shapes for illumination cavities 406 for assembly 100 and/or system 300 for an illuminated ball game. For example, such illumination cavity may be flat bottomed, spherically bottomed, mushroom bottomed, egg bottomed, shorter or longer than a radius of the sporting equipment assembly, approximately equal to a radius of the sporting equipment assembly, and/or shaped substantially concentrically relative to an outer shape of sporting equipment assembly, such that a thickness of the body of the sporting equipment assembly is substantially uniform outside a threaded portion configured to receive a light cap assembly housing 410.

Figure 7:
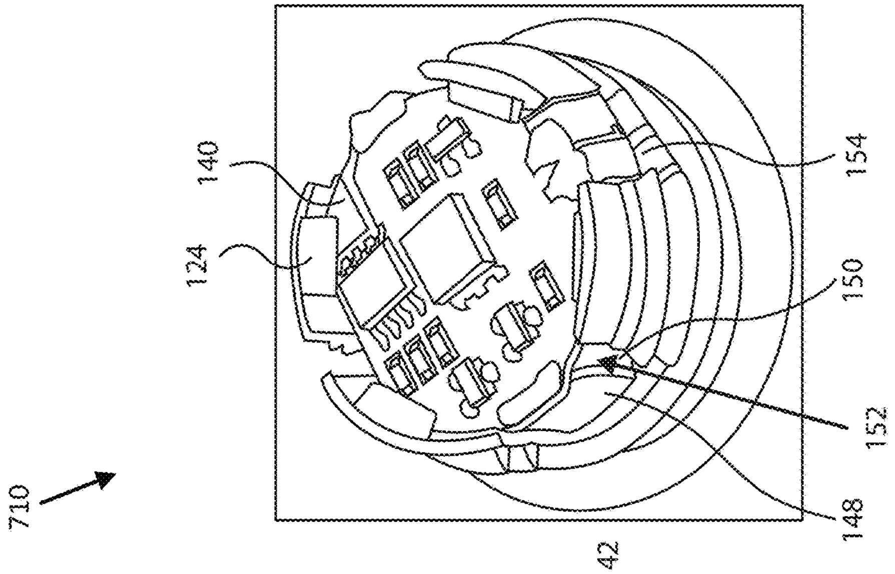
FIGS. 5-7 illustrate light cap assemblies for illuminated sporting equipment assemblies in accordance with an embodiment of the disclosure.
Figure 6:
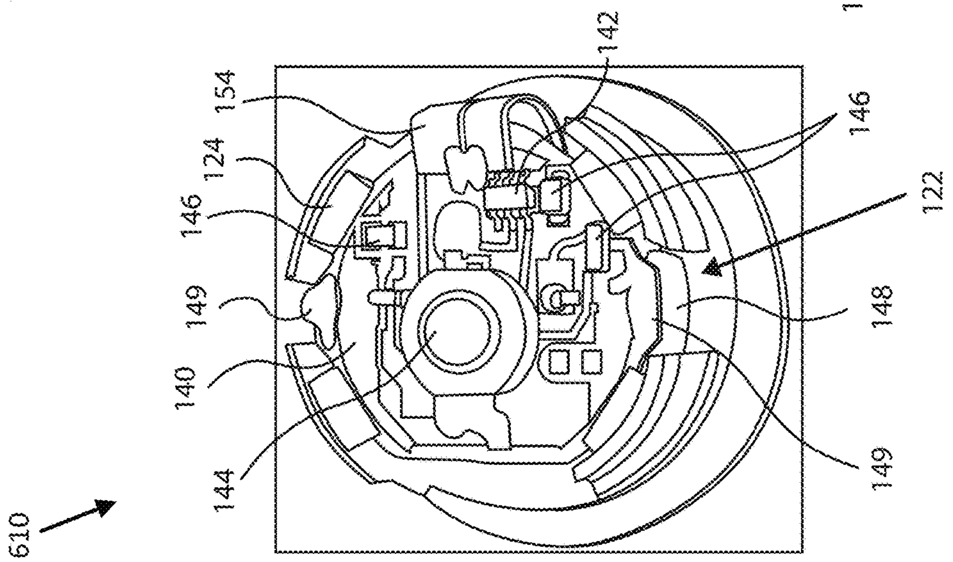
Figure 5:
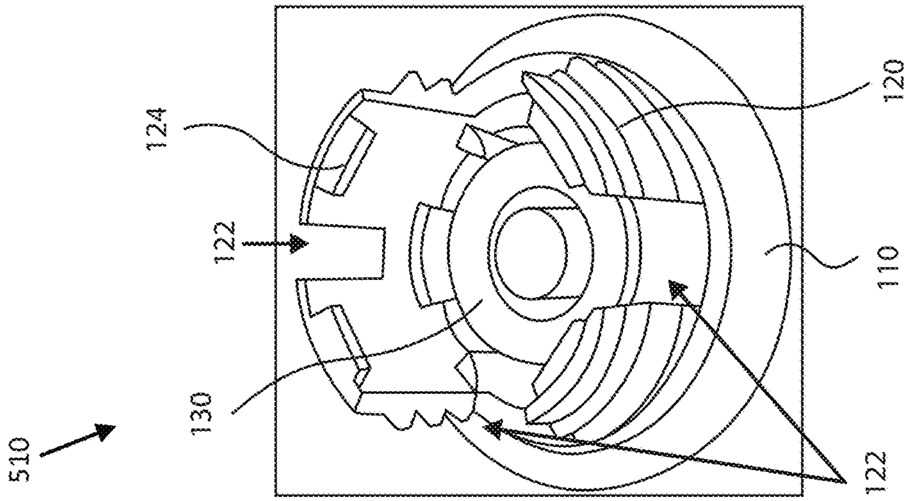
Figure 8:
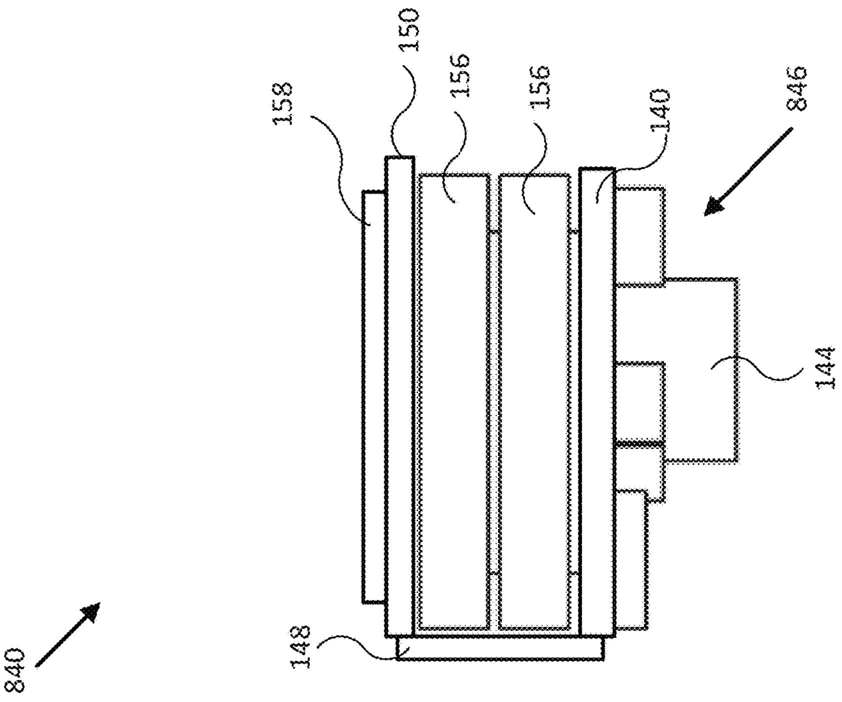
FIG. 8 illustrates an integrated circuit stack for illuminated sporting equipment assemblies in accordance with an embodiment of the disclosure.

FIGS. 5-7 illustrate light cap assemblies 510, 610, 710 for illuminated sporting equipment assemblies. In FIG. 5, light cap assembly 510 includes four flexible members 120 spaced from each other by gaps 122 and each including tabs 124 configured to secure an IC stack within light cap assembly 510, all formed by a unitary light cap assembly housing 110 (e.g., one continuous piece of material). Light cap assembly 510 may include button module 130 to engage an actuator switch, as shown in FIG. 8. Light cap assembly 510 is shown without an IC stack.

In FIG. 6, light cap assembly 610 includes PCB 140 secured within light cap assembly 610 by flexible members 120 and tabs 124, and microcontroller 142, LED module 144, and various electronic components 146 (resistors, capacitors, regulators, amplifiers, transistors) soldered to PCB 140. Also shown are vertical members 148 disposed within gaps 122 and securing PCB 140 to a support base 150 shown in FIG. 7 (e.g., via solder joints 149). Vertical members 148 may be coated so as to be electrically insulated from batteries placed within a battery cavity 152 formed between support base 150 and PCB 140. Also shown is conductive ribbon 154 electrically coupling support base 150 to electrical components on PCB 140. FIG. 7 illustrates a different embodiment light cap assembly 710 with different electronic components and a different LED module, and FIG. 7 shows support base 150 and battery cavity 152 of light cap assembly 710.

Figure 9:
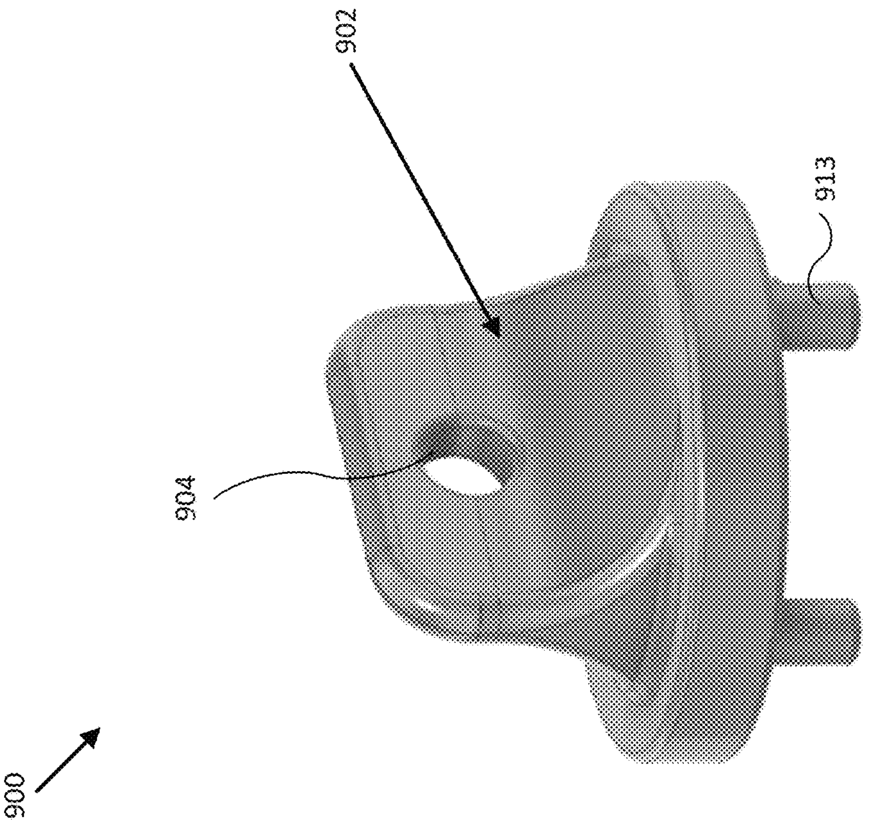
FIG. 9 illustrates a cap wrench for illuminated sporting equipment assemblies in accordance with an embodiment of the disclosure.

FIG. 8 illustrates an IC stack 840 for illuminated sporting equipment assemblies. In FIG. 8, IC stack 840 includes LED module 144, electronic components 846 on PCB 140, vertical members 148 securing PCV 140 to base 150, and actuator switch 158 secured to support base 150 opposite a battery cavity 152 housing batteries 156, as shown. Actuator switch 158 may be configured to be actuated by button module 130 in FIG. 1, for example. FIG. 9 illustrates a cap wrench 900 for illuminated sporting equipment assemblies. In FIG. 9, cap wrench 900 includes wrench nodes 913, lanyard hole 904, and grip 902.

Figure 10:
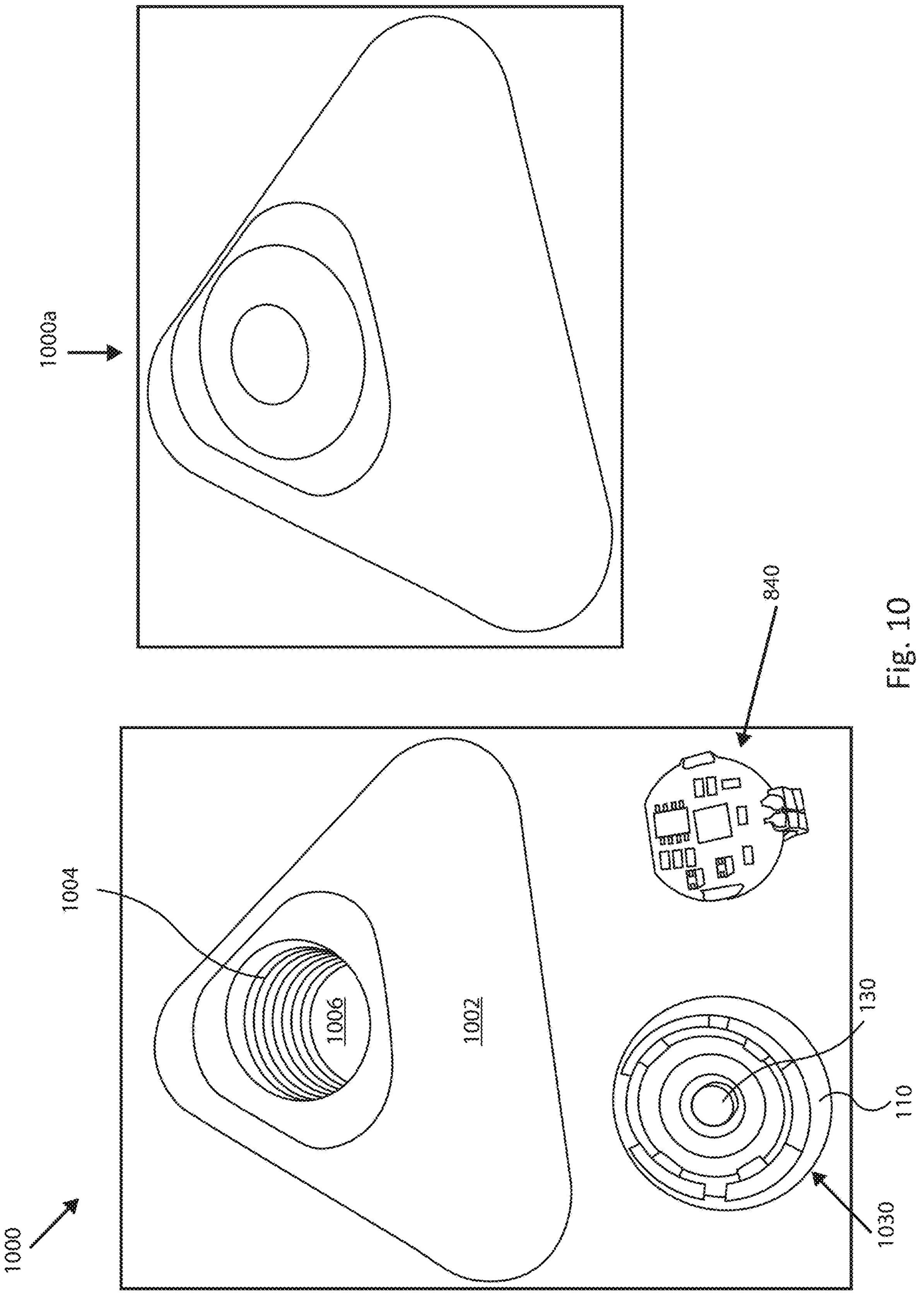
FIG. 10 illustrates an illuminated sporting equipment assembly in accordance with an embodiment of the disclosure.

FIG. 10 illustrates an illuminated sporting equipment assembly 1000, such as an illuminated and/or floating cone. In FIG. 10, assembly 1000 includes pyramid shaped cone body 1002, threads 1004 of body 1002 leading to an illumination cavity 1006, light cap assembly housing 110 configured to securely couple to body 1002 via threads 1004, and button module 130 configured to be inserted into light cap assembly housing 110 to form (e.g., with an IC stack 840 shown in FIG. 8) a light cap assembly 1030 (e.g., similar to light cap assembly 510, 610, or 710 shown in FIGS. 5-7), which when assembled is illustrated by assembly 1000*a*, as shown.

Where applicable, the various components set forth herein can be combined into composite components and/or separated into sub-components without departing from the spirit of the present disclosure.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:

a sporting equipment object body comprising an illumination cavity; and a light cap assembly configured to be secured to the sporting equipment object body, wherein the light cap assembly comprises a light cap assembly housing configured to secure an integrated circuit stack within the light cap assembly housing, and wherein the integrated circuit stack is configured to generate light within the illumination cavity of the sporting equipment object body; wherein the light cap assembly housing comprises a plurality of threaded flexible members configured to be screwed into and secured within the sporting equipment object body by a corresponding threaded portion of the sporting equipment object body.

2. The system of claim 1, wherein:

each threaded flexible member comprises a tab configured to secure the integrated circuit stack within the light cap assembly housing.

3. The system of claim 1, wherein:

the plurality of threaded flexible members are spaced from each other by gaps formed within the light cap assembly housing.

4. The system of claim 1, wherein:

the light cap assembly housing comprises a top surface configured to conform to a shape and/or a radius of the sporting equipment object body.

5. The system of claim 1, wherein:

the sporting equipment object body comprises a threaded portion configured to receive the light cap assembly housing.

6. The system of claim 1, wherein:

the integrated circuit stack comprises a printed circuit board secured to a support base via at least one vertical member comprising a coating configured to electrically insulate the vertical member from a battery of the integrated circuit stack.

7. The system of claim 6, wherein:

the integrated circuit stack comprises a conductive ribbon electrically coupling the support base to electrical components disposed on the printed circuit board of the integrated circuit stack.

8. The system of claim 6, wherein:

the integrated circuit stack comprises a battery cavity disposed between the support base and the printed circuit board of the integrated circuit stack.

9. The system of claim 1, wherein:

the integrated circuit stack comprises an actuator switch and a light emitting diode disposed on opposite sides of the integrated circuit stack.

10. The system of claim 1, wherein:

the light cap assembly housing comprises at least one wrench notch configured to receive a corresponding wrench node of a cap wrench.

11. The system of claim 1, further comprising a cap wrench, wherein:

the cap wrench comprises at least one wrench node configured to be received by a corresponding wrench notch of the light cap assembly housing.

12. The system of claim 11, wherein:

the cap wrench comprises a grip and/or a lanyard hole.

13. The system of claim 1, further comprising a cap wrench, wherein:

the cap wrench comprises a plurality of wrench nodes configured to be received by a corresponding plurality of wrench notches of the light cap assembly housing.

14. The system of claim 1, wherein:

the illumination cavity comprises a flat bottomed, spherically bottomed, mushroom bottomed, or egg bottomed illumination cavity.

15. The system of claim 1, wherein:

the illumination cavity is shorter or longer than a radius of the sporting equipment object body.

16. The system of claim 1, wherein:

the illumination cavity is approximately equal in length to a radius of the sporting equipment assembly.

17. The system of claim 1, wherein:

the illumination cavity is shaped substantially concentrically relative to an outer shape of the sporting equipment object body, such that a thickness of the sporting equipment object body is substantially uniform outside a threaded portion of the sporting equipment object body that is configured to receive the light cap assembly housing.

18. The system of claim 1, wherein:

the sporting equipment object body comprises a ball shaped body.

19. The system of claim 1, wherein:

the sporting equipment object body comprises a pyramid and/or cone shaped body.

* * * * *